United States Patent
Chauhan (10) Patent No.: US 10,073,704 B1
(45) Date of Patent: Sep. 11, 2018

(54) APPARATUS, SYSTEM, AND METHOD FOR INITIALIZING ADAPTIVE EQUALIZER DEVICES

(71) Applicant: Juniper Networks, Inc., Sunnyvale, CA (US)

(72) Inventor: Tapan Kumar Chauhan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 435 days.

(21) Appl. No.: 14/458,222

(22) Filed: Aug. 12, 2014

(51) Int. Cl.
*G06F 9/4401* (2018.01)
*H04L 25/03* (2006.01)

(52) U.S. Cl.
CPC ...... *G06F 9/4411* (2013.01); *H04L 25/03019* (2013.01)

(58) Field of Classification Search
CPC .......................... H04L 25/03019; G06F 9/4411
USPC .......................................................... 710/10
See application file for complete search history.

(56) References Cited

U.S. PATENT DOCUMENTS

| | | | | |
|---|---|---|---|---|
| 7,652,982 B1* | 1/2010 | Kovummal | ......... | G06F 11/1438 370/216 |
| 8,176,311 B1* | 5/2012 | Srinivasan et al. | ................ | 713/2 |
| 8,180,919 B1* | 5/2012 | Melinn | ............... | G06F 17/5054 340/1.1 |
| 2002/0010902 A1* | 1/2002 | Chen | ........................ | G06F 1/10 716/117 |
| 2008/0044181 A1* | 2/2008 | Sindhu | ........................... | 398/49 |
| 2010/0058274 A1* | 3/2010 | Pike | ........................ | H04L 45/60 716/128 |
| 2014/0341574 A1* | 11/2014 | Yan | .................... | H04Q 11/0005 398/49 |

OTHER PUBLICATIONS

"Adaptive equalizer", http://en.wikipedia.org/wiki/Adaptive_equalizer, as accessed Jun. 18, 2014, Wikipedia,(Dec. 15, 2005).

* cited by examiner

*Primary Examiner* — Idriss N Alrobaye
*Assistant Examiner* — Brooke J Taylor
(74) *Attorney, Agent, or Firm* — FisherBroyles, LLP (57) ABSTRACT

The disclosed apparatus may include a memory device that stores firmware intended for a plurality of adaptive equalizer devices that equalize communication signals received via a plurality of communication channels. The disclosed apparatus may also include a controller circuit communicatively coupled to the memory device. The controller circuit may detect a power-on event during which the plurality of adaptive equalizer devices begin to receive electrical power. In response to detecting the power-on event, the controller circuit may initialize the plurality of adaptive equalizer devices by writing at least a portion of the firmware stored in the memory device to each of the plurality of adaptive equalizer devices. Various other apparatuses, systems, and methods are also disclosed.

9 Claims, 7 Drawing Sheets

APPARATUS, SYSTEM, AND METHOD FOR INITIALIZING ADAPTIVE EQUALIZER DEVICES

BACKGROUND

Adaptive equalizer devices are often used to equalize communication signals received within a network. For example, a router may include several communication ports that facilitate communication among computing devices within a network. In this example, each communication port may have an adaptive equalizer device that equalizes and/or conditions communication signals received via that communication port. The equalization properties of the adaptive equalizer device may be reconfigurable and/or controlled by the device's firmware.

Traditional network devices often include a different memory device for each adaptive equalizer device. For example, a traditional router may include a line card with 16 adaptive equalizer devices. In this example, each adaptive equalizer device may rely on a different Electrically Erasable Programmable Read Only-Memory (EEPROM) device to store that device's firmware. Accordingly, the router's line card may include 16 EEPROM devices that store firmware for the 16 adaptive equalizer devices.

These memory devices, along with the corresponding conductive traces that provide electrical and/or communicative support, take up physical space on Printed Circuit Boards (PCBs) within the network devices. Unfortunately, such physical space is often limited by certain design constraints (such as size, cost, and/or performance). Moreover, each memory device may add to the overall cost of the PCBs within the network devices and/or increase the amount of diagnostics and/or testing overhead needed to ensure that the PCBs are fully operational.

The instant disclosure, therefore, identifies and addresses a need for improved apparatuses, systems, and methods for initializing adaptive equalizer devices.

SUMMARY

As will be described in greater detail below, the instant disclosure generally relates to apparatuses, systems, and methods for initializing adaptive equalizer devices. In one example, an apparatus for accomplishing such a task may include a memory device that stores firmware intended for a plurality of adaptive equalizer devices that equalize communication signals received via a plurality of communication channels. This apparatus may also include a controller circuit communicatively coupled to the memory device. The controller circuit may detect a power-on event during which the plurality of adaptive equalizer devices begin to receive electrical power. In response to detecting the power-on event, the controller circuit may initialize the plurality of adaptive equalizer devices by writing at least a portion of the firmware stored in the memory device to each of the plurality of adaptive equalizer devices.

Similarly, a system incorporating the above-described apparatus may include a PCB that includes a plurality of conductive traces. This system may also include a plurality of communication channels that facilitate transmission of communication signals via the PCB. This system may further include a memory device that stores firmware intended for a plurality of adaptive equalizer devices that equalize the communication signals received via the plurality of communication channels. Additionally or alternatively, this system may include a controller circuit communicatively coupled to the memory device via the PCB. The controller circuit may detect a power-on event during which the plurality of adaptive equalizer devices begin to receive electrical power. In response to detecting the power-on event, the controller circuit may initialize the plurality of adaptive equalizer devices by writing at least a portion of the firmware stored in the memory device to each of the plurality of adaptive equalizer devices.

A corresponding method may include detecting, by a controller circuit of a network device, a power-on event that enables a plurality of adaptive equalizer devices that equalize communication signals to begin receiving electrical power. This method may also include initializing, by the controller circuit of the network device, the plurality of adaptive equalizer devices in response to detecting the power-on event. The initialization may include identifying, in a memory device of the network device, firmware intended for the plurality of adaptive equalizer devices. The initialization may also include writing at least a portion of the firmware identified in the memory device to each of the plurality of adaptive equalizer devices to configure at least one equalization property of each of the plurality of adaptive equalizer devices.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for initializing adaptive equalizer devices. As will be explained in greater detail below, by enabling a single memory device to store firmware intended for a plurality of adaptive equalizer devices, the various apparatuses, systems, and methods described herein may help reduce the amount of physical space needed to support distribution of the firmware to all of the adaptive equalizer devices at power-on. By reducing the number of memory devices needed to store the firmware intended for the plurality of adaptive equalizer devices, the various apparatuses, systems, and methods described herein may help decrease the overall cost of a PCB (such as a line card or backplane) that facilitates storage and/or distribution of such firmware. Additionally or alternatively, these apparatuses, systems, and methods may help decrease the amount of software support, diagnostics, and/or testing needed to ensure that the PCBs are fully operational.

The following will provide, with reference to FIGS. 1, 3, 4, and 5, examples of apparatuses that facilitate initializing adaptive equalizer devices. The discussion corresponding to FIG. 2 will provide a detailed description of an exemplary representation of firmware stored in a memory device. The discussion corresponding to FIG. 6 will provide a detailed description of an exemplary method for initializing adaptive equalizer devices. Finally, the discussion corresponding to FIG. 7 will provide numerous examples of systems that may include the apparatus shown in FIG. 1.

Figure 1:
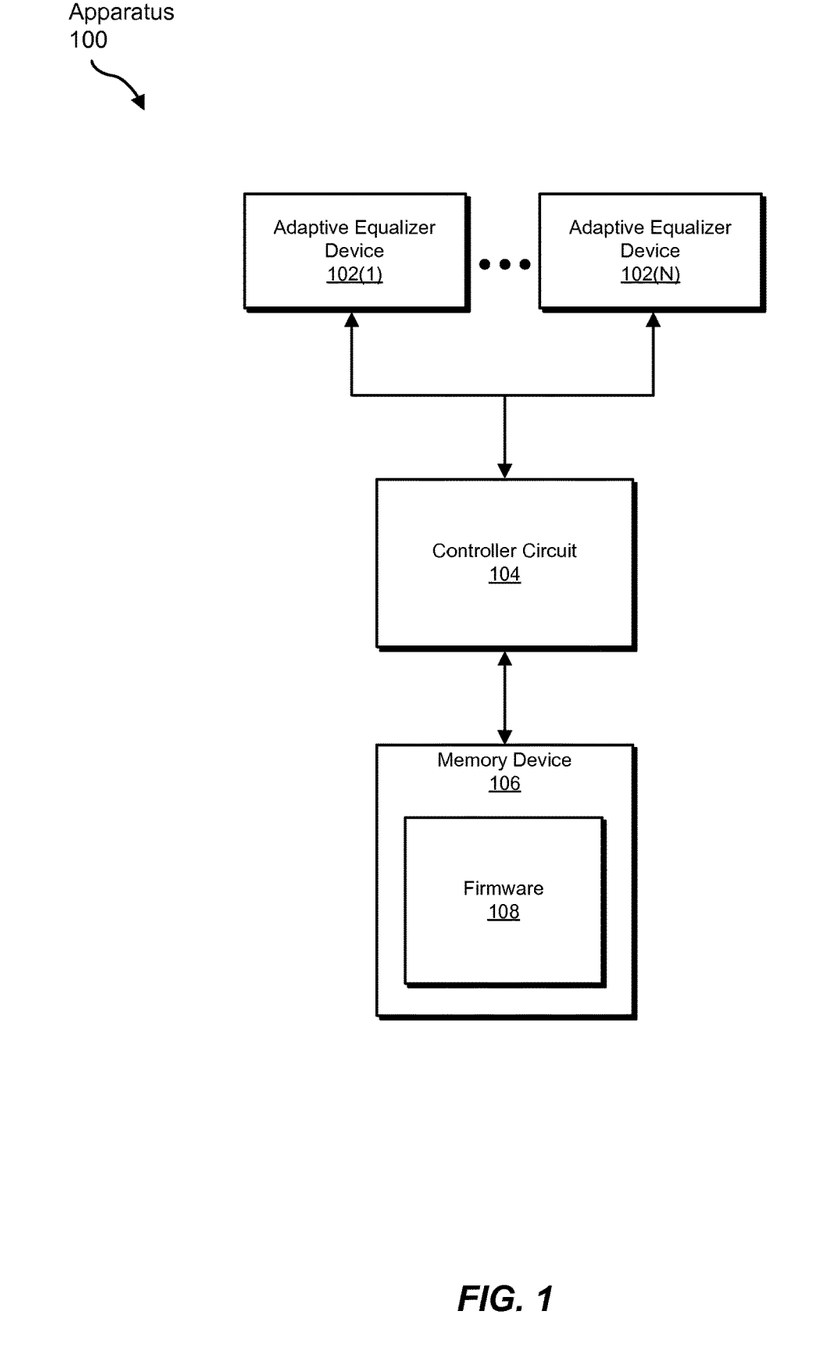
FIG. 1 is a block diagram of an exemplary apparatus for initializing adaptive equalizer devices.

FIG. 1 shows a block diagram of an exemplary apparatus 100 for initializing adaptive equalizer devices. The phrases "initializing" and "initialization," as used herein in connection with an adaptive equalizer device, generally refer to any type or form of process and/or procedure that sets and/or configures the adaptive equalizer device for operation. In one example, initialization of an adaptive equalizer device may involve writing and/or applying firmware to the adaptive equalizer device at power-on. By writing and/or applying the firmware to the adaptive equalizer device in this way, such initialization may enable the adaptive equalizer device to equalize and/or condition communication signals received by a communication channel (such as a port, interface, and/or data lane).

As illustrated in FIG. 1, apparatus 100 may include a controller circuit 104 in communication with memory device 106 and a plurality of adaptive equalizer devices 102(1)-(N). The term "controller circuit," as used herein, generally refers to any type or form of physical hardware, circuit, and/or device that performs certain Input/Output (I/O) operations and/or computing tasks by processing and/or executing computer-readable instructions. In one example, controller circuit 104 may represent an integrated circuit whose configuration and/or infrastructure is at least partially fixed. Additionally or alternatively, controller circuit 104 may represent an integrated circuit whose configuration and/or infrastructure is at least partially variable and/or programmable. Examples of controller circuit 104 include, without limitation, Field-Programmable Gate Arrays (FPGAs), Central Processing Units (CPUs), processors, microprocessors, microcontrollers, Application-Specific Integrated Circuits (ASICs), combinations of one or more of the same, variations of one or more of the same, or any other suitable controller circuit.

The term "adaptive equalizer device," as used herein, generally refers to any type or form of device, system, and/or mechanism that equalizes and/or conditions a communication signal by adapting to one or more time-varying properties of a communication channel. In one example, adaptive equalizer devices 102(1)-(N) may each include an internal processor that executes an equalization algorithm defined and/or controlled by firmware. In this example, the equalization algorithm may facilitate processing and/or adapting to a communication signal received by a communication channel. Examples of adaptive equalizer devices 102(1)-(N) include, without limitation, adaptive equalizers, decision feedback equalizers, phase shift filters, least-mean-squares filters, recursive-least-squares filters, combinations of one or more of the same, variations of one or more of the same, or any other suitable adaptive equalizer devices.

The term "memory device," as used herein, generally refers to any type or form of physical hardware, circuit, device, and/or medium that facilitates recording, storing, and/or distributing firmware intended for an adaptive equalizer device. In one example, memory device 106 may represent a portion of controller circuit 104. Additionally or alternatively, memory device 106 may represent a stand-alone device accessible to controller circuit 104. Examples of memory device 106 include, without limitation, Random-Access Memory (RAM) devices, Block RAM (BRAM) devices, Read-Only Memory (ROM) devices, EEPROM devices, flash memory devices, volatile memory, non-volatile memory, combinations of one or more of the same, variations of one or more of the same, or any other suitable memory device.

As illustrated in FIG. 1, memory device 106 may include and/or store firmware 108. The term "firmware," as used herein, generally refers to any type or form of infrastructure, program, and/or machine-readable code that defines and/or controls the operation of an adaptive equalizer device. In one example, firmware 108 may include and/or represent a combination of hardware and/or software components. Additionally or alternatively, firmware 108 may tailor the operation of one or more of adaptive equalizer device 102(1)-(N) to a specific use, need, and/or application.

In some examples, controller circuit 104 may be communicatively coupled to memory device 106. In such examples, controller circuit 104 may detect a power-on event during which adaptive equalizer devices 102(1)-(N) begin to receive electrical power. The term "power-on event," as used herein, generally refers to any type or form of event and/or action that results in an adaptive equalizer device receiving electrical power. The power-on event may indicate, suggest, and/or represent the point in time that adaptive equalizer devices 102(1)-(N) begin to receive electrical power.

As a specific example, a user may turn on a network device that includes controller circuit 104 and/or adaptive equalizer devices 102(1)-(N). The term "network device," as used herein, generally refers to any type or form of computing device that facilitates the flow of data traffic within a network. The network device may represent a hop that forwards data traffic along a path within a network and/or across a plurality of networks. Examples of such a network device include, without limitation, switches, routers, network hubs, gateways, service delivery gateways, nodes, bridges, servers, firewalls, Next Generation FireWalls (NG-FWs), Deep Packet Inspection (DPI) systems, exemplary computing system 700 in FIG. 7, combinations of one or more of the same, portions of one or more of the same, variations of one or more of the same, or any other suitable network device.

As the user turns on the network device, controller circuit 104 and/or adaptive equalizer devices 102(1)-(N) may receive electrical power. In this example, controller circuit 104 may determine that adaptive equalizer devices 102(1)-(N) have begun to receive electrical power based at least in part on a power-up and/or boot-up process or notification. Additionally or alternatively, controller circuit 104 may detect a switch or change from power-off to power-on in connection with adaptive equalizer devices 102(1)-(N).

In some examples, controller circuit 104 may initialize adaptive equalizer devices 102(1)-(N) in response to detecting the power-on event. In such examples, controller circuit 104 may perform the initialization by writing at least a portion of firmware 108 stored in memory device 106 to each of adaptive equalizer devices 102(1)-(N).

Figure 2:
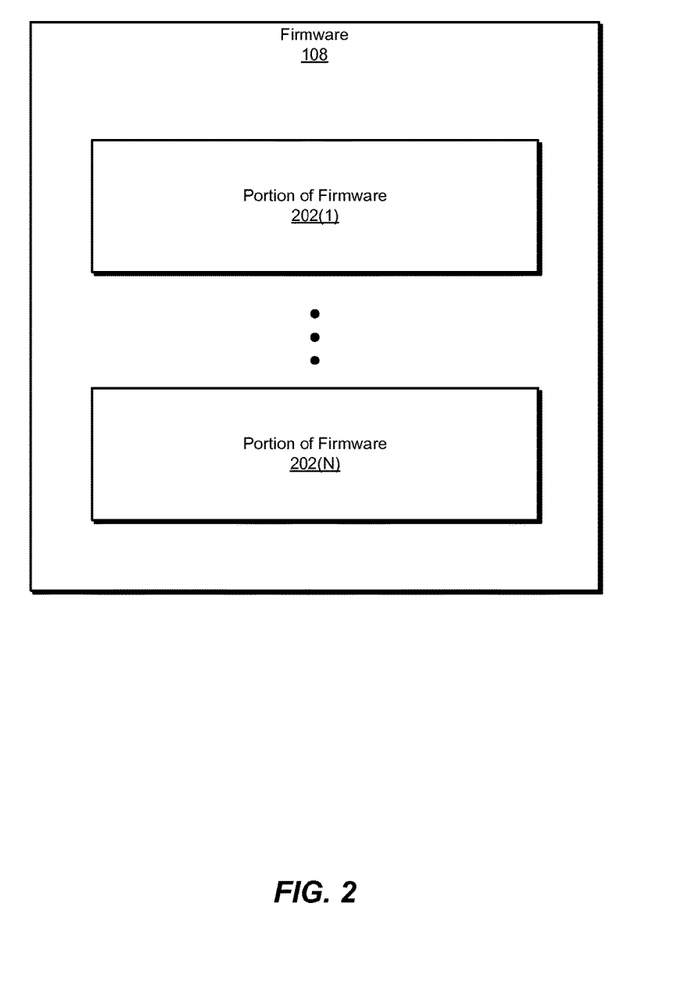
FIG. 2 is a block diagram of an exemplary representation of firmware stored in a memory device.

In one example, firmware 108 may include various portions that are intended specifically for different adaptive equalizer devices. As illustrated in FIG. 2, firmware 108 may include portions 202(1)-(N). In this example, each of portions 202(1)-(N) of firmware 108 may correspond to one of adaptive equalizer devices 202(1)-(N). For example, portion 202(1) of firmware 108 may be intended for and/or configured to control adaptive equalizer device 102(1). Additionally or alternatively, portion 202(N) of firmware 108 may be intended for and/or configured to control adaptive equalizer device 102(N).

In one example, firmware 108 may include multiple portions that are intended specifically for the same adaptive equalizer device(s), depending on the particular application. For example, one or more of portions 202(1)-(N) of firmware 108 may correspond to adaptive equalizer device 202(1). In this example, portion 202(1) of firmware 108 may be intended for and/or configured to control adaptive equalizer device 102(1) when an optic-type connection is plugged into the communication channel handled by adaptive equalizer device 102(1). Additionally or alternatively, another portion of firmware 108 may be intended for and/or configured to control adaptive equalizer device 102(1) when a CATegory 5 (CAT 5) connection is plugged into the communication channel handled by adaptive equalizer device 102(1).

Exemplary apparatus 100 in FIG. 1 may be arranged in a variety of ways. For example, all or a portion of exemplary apparatus 100 may be arranged on a single PCB. In this example, the PCB may include and/or represent a line card and/or a backplane installed in a network device. The term "line card," as used herein, generally refers to any type or form of circuit board with one or more ports and/or interfaces that facilitate communication within a network and/or across a plurality of networks. The term "backplane," as used herein, generally refers to any type or form of circuit board that connects certain ports and/or interfaces from a plurality of line cards installed in a network device.

Exemplary apparatus 100 in FIG. 1 may be implemented in a variety of ways. For example, all or a portion of exemplary apparatus 100 may represent portions of exemplary apparatus 300 in FIG. 3. In this example, controller circuit 104 in FIG. 1 may include and/or represent an FPGA 304 in FIG. 3. In this example, memory device 106 in FIG. 1 may include and/or represent a BRAM 306 in FIG. 3 internal to FPGA 304. Accordingly, BRAM 306 may include and/or store firmware 108.

Figure 3:
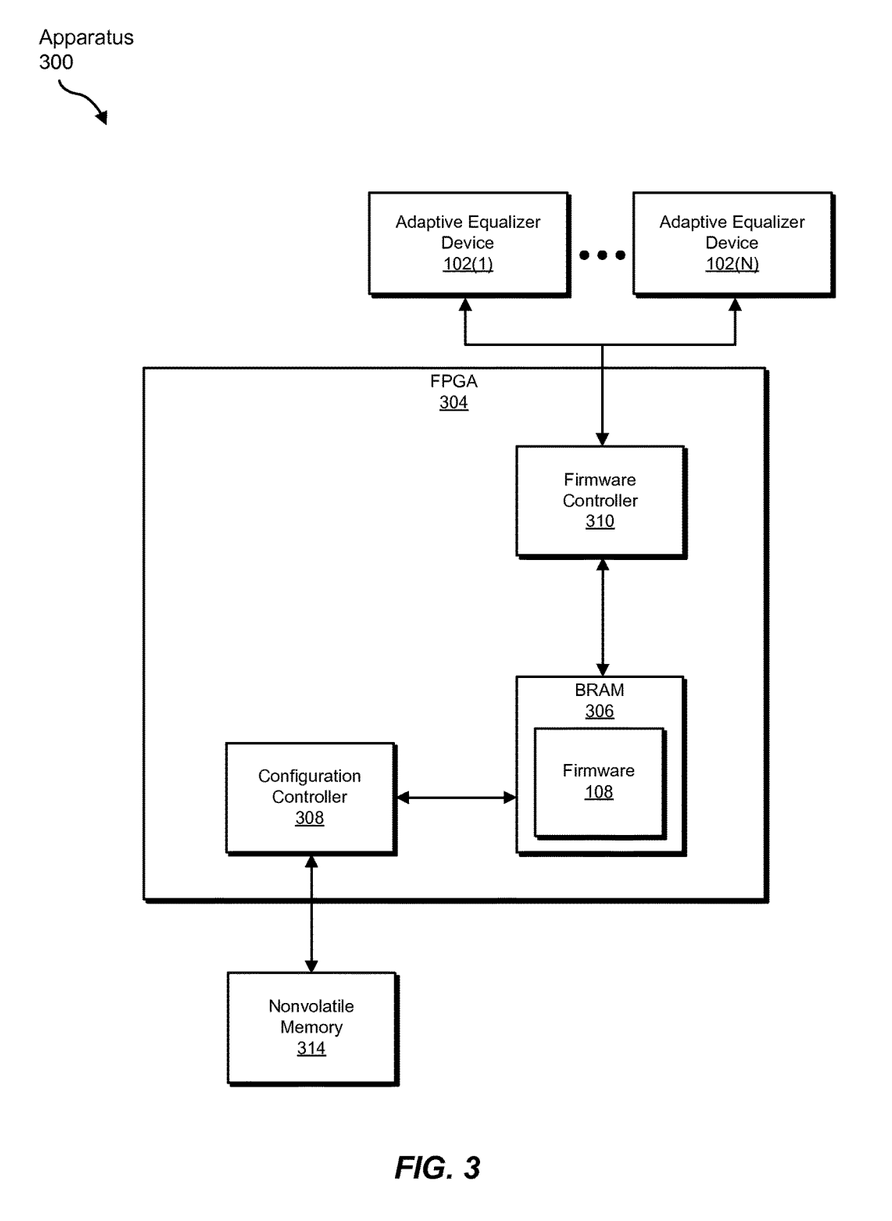
FIG. 3 is a block diagram of an exemplary apparatus for initializing adaptive equalizer devices.

As shown in FIG. 3, FPGA 304 may also include a configuration controller 308 and/or a firmware controller 310. The term "configuration controller," as used herein, generally refers to any type or form of device, module, and/or mechanism that facilitates configuring an FPGA and/or downloading configuration images and/or firmware to the FPGA. In one example, configuration controller 308 may enable FPGA 304 to download firmware 108 from a non-volatile memory 314 to BRAM 306 during a configuration process. In this example, the configuration process may involve downloading an FPGA configuration image that defines and/or controls the programmable logic configuration of FPGA 304. Accordingly, firmware 108 may represent a portion of data included in the FPGA configuration image downloaded to BRAM 306 during this configuration process.

The term "firmware controller," as used herein, generally refers to any type or form of device, module, and/or mechanism that facilitates configuring an adaptive equalizer device in communication with an FPGA and/or uploading firmware from the FPGA to the adaptive equalizer device. In one example, firmware controller 310 may enable FPGA 304 to configure adaptive equalizer devices 102(1)-(N) by uploading at least a portion of firmware 108 stored in BRAM 306 to each of adaptive equalizer devices 102(1)-(N). For example, firmware controller 310 may retrieve firmware 108 from the FPGA configuration image downloaded to BRAM 306. Upon retrieving firmware 108 from the FPGA configuration image, firmware controller 310 may simultaneously write at least a portion of firmware 108 to each of adaptive equalizer devices 102(1)-(N) via a specific communication protocol that facilitates substantially simultaneous firmware writes. Firmware controller 310 may perform these writes simultaneously by leveraging and/or implementing the parallel processing capabilities of FPGA 304.

As a specific example, firmware controller 310 may write portion 202(1) of firmware 108 to adaptive equalizer device 102(1) via an Inter-Integrated Circuit (I$^2$C) communication bus or Serial Peripheral Interface (SPI) communication bus. At substantially the same time, firmware controller 310 may write portion 202(N) of firmware 108 to adaptive equalizer device 102(N) via the I$^2$C or SPI communication bus. By simultaneously writing portions 202(1)-(N) of firmware 108 to adaptive equalizer devices 102(1)-(N) in this way, firmware controller 310 may configure adaptive equalizer devices 102(1)-(N) for operation in accordance with firmware 108.

In one example, FPGA 304 may operate as a master device under the I$^2$C or SPI communication protocol. The terms "master" and "master device," as used herein, generally refer to any type or form of device, module, and/or mechanism that has unidirectional control over and/or initiates a data transfer with another device via a specific communication protocol. For example, firmware controller 310 may direct FPGA 304 to operate as a master device relative to the I$^2$C or SPI communication bus.

Additionally or alternatively, one or more of adaptive equalizer devices 102(1)-(N) may operate as one or more slave devices under the I$^2$C or SPI communication protocol. The terms "slave" and "slave device," as used herein, generally refer to any type or form of device, module, and/or mechanism that is subject to unidirectional control from and/or involved in a data transfer initiated by another device via a specific communication protocol. In this example, while operating as the master, FPGA 304 may simultaneously write portions 202(1)-(N) of firmware 108 to adaptive equalizer devices 102(1)-(N) operating as slaves via to the I$^2$C or SPI communication bus.

Figure 4:
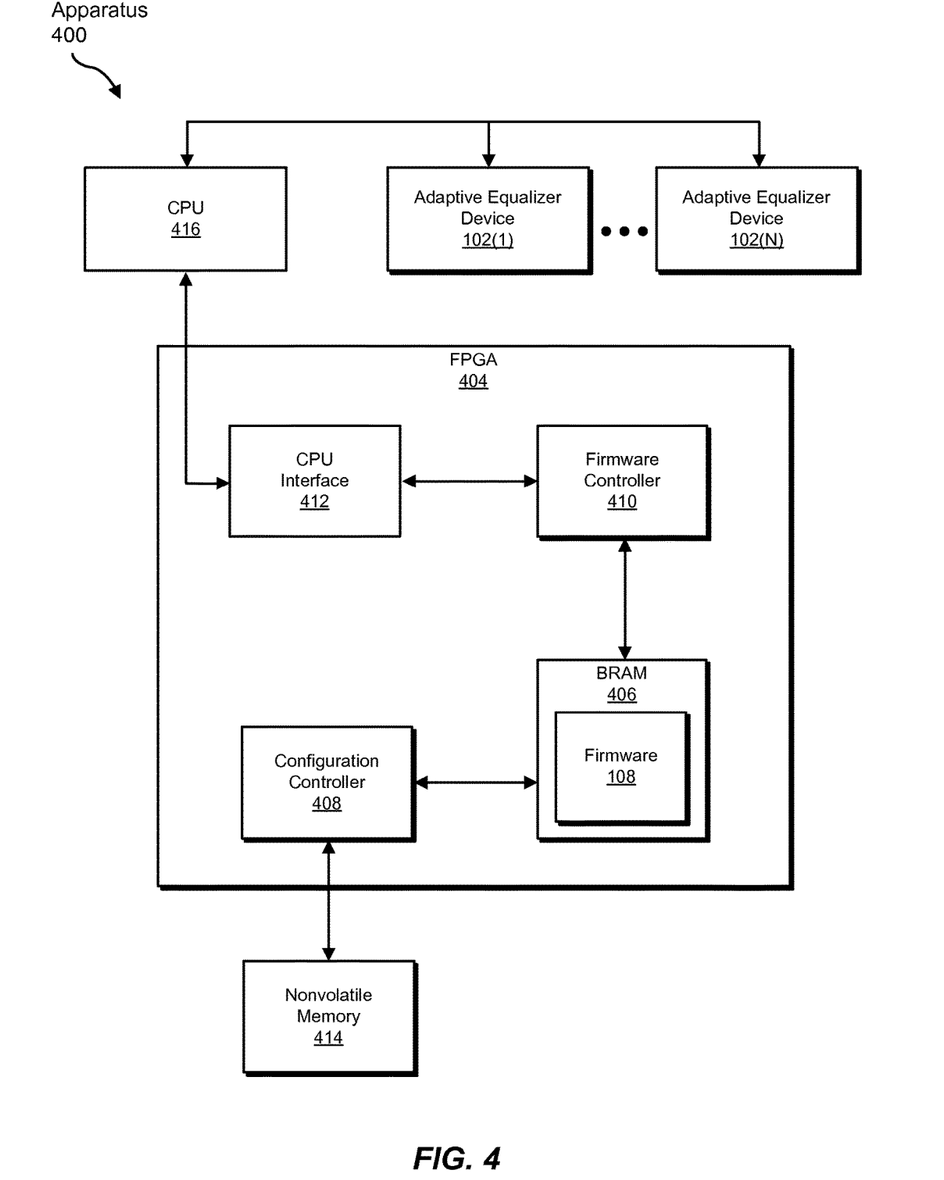
FIG. 4 is a block diagram of an exemplary apparatus for initializing adaptive equalizer devices.

As another example, all or a portion of exemplary apparatus 100 may represent portions of exemplary apparatus 400 in FIG. 4. In this example, controller circuit 104 in FIG. 1 may include and/or represent a CPU 416 in FIG. 4. Memory device 106 in FIG. 1 may include and/or represent a BRAM 406 in FIG. 4 that is internal to an FPGA 404. Accordingly, BRAM 406 may include and/or store firmware 108.

As shown in FIG. 4, FPGA 404 may also include a configuration controller 408, a firmware controller 410, and/or a CPU interface 412. The term "CPU interface," as used herein, generally refers to any type or form of device, module, and/or mechanism that enables an FPGA to interface and/or communicate with a CPU. In one example, configuration controller 408 may enable FPGA 404 to download firmware 108 from a non-volatile memory 414 to BRAM 406 during a configuration process. In this example, the configuration process may involve downloading an FPGA configuration image that defines and/or controls the programmable logic configuration of FPGA 404. Accordingly, firmware 108 may represent a portion of data included in the FPGA configuration image downloaded to BRAM 406 during this configuration process.

In one example, CPU 416 may obtain firmware 108 from FPGA 404 via a Peripheral Component Interconnect (PCI) or PCI Express (PCIe) communication bus. For example, CPU 416 may request firmware 108 from CPU interface 412 of FPGA 404 via the PCI or PCIe communication bus. In response to this request, CPU interface 412 may direct firmware controller 410 to retrieve firmware 108 from the FPGA configuration image downloaded to BRAM 406. Upon retrieving firmware 108 from the FPGA configuration image, firmware controller 410 may feed and/or provide firmware 108 to CPU interface 412. CPU interface 412 may then enable FPGA 404 to forward firmware 108 to CPU 416 via the PCI or PCIe communication bus.

Upon receiving firmware 108 from FPGA 404, CPU 416 may configure adaptive equalizer devices 102(1)-(N) by serially writing at least a portion of firmware 108 to each of adaptive equalizer devices 102(1)-(N) via an $I^2C$ or SPI communication bus. For example, CPU 416 may write portion 202(1) of firmware 108 to adaptive equalizer device 102(1) via the $I^2C$ or SPI communication bus. CPU 416 may then write portion 202(N) of firmware 108 to adaptive equalizer device 102(N) via the $I^2C$ or SPI communication bus. By serially writing portions 202(1)-(N) of firmware 108 to adaptive equalizer devices 102(1)-(N) in this way, CPU 416 may configure adaptive equalizer devices 102(1)-(N) for operation in accordance with firmware 108. CPU 416 may be unable to perform these writes simultaneously like FPGA 304 due at least in part to a lack of parallel processing capabilities.

In one example, CPU 416 may include a temporary data buffer (not illustrated in FIG. 4) that temporarily stores at least a portion of firmware 108. In this example, the temporary data buffer may include and/or represent at least a portion of RAM internal and/or accessible to CPU 416.

Figure 5:
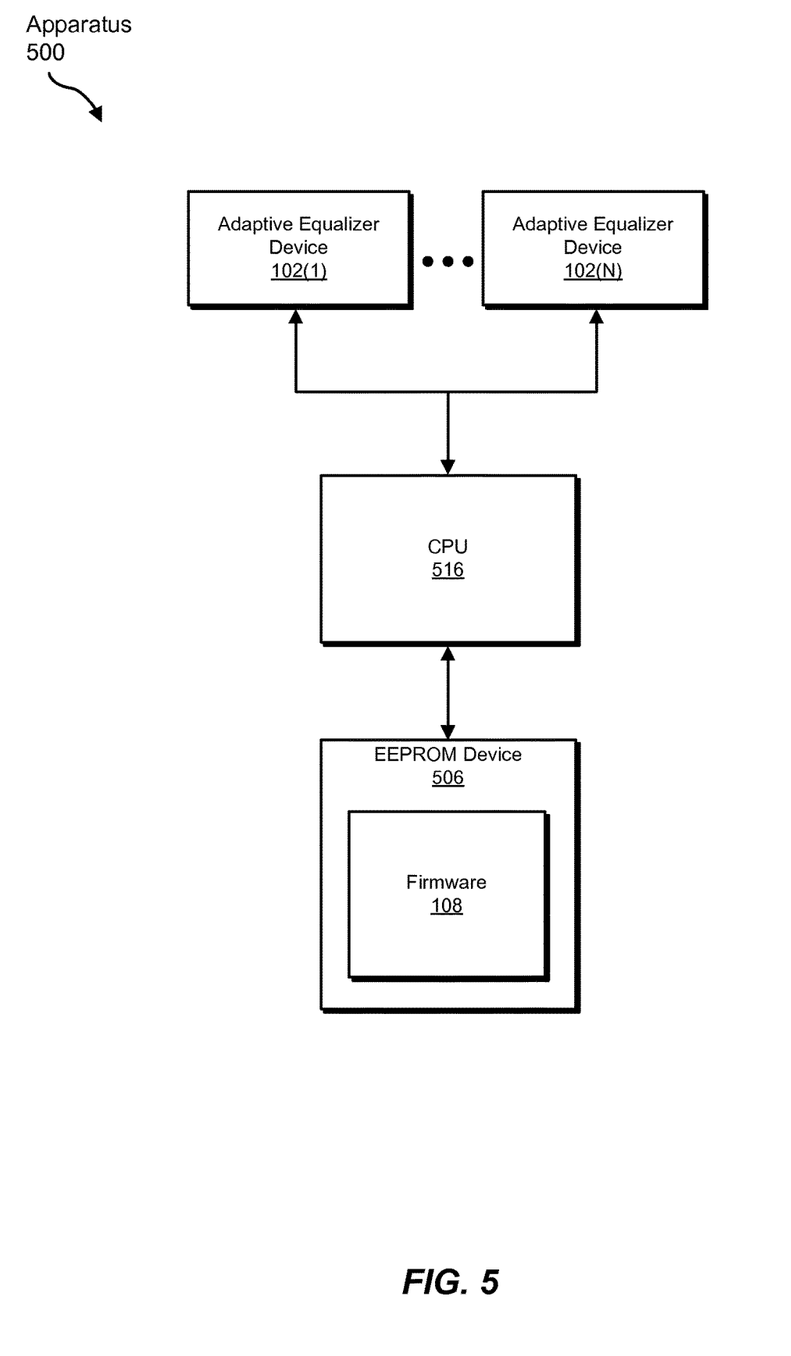
FIG. 5 is a block diagram of an exemplary apparatus for initializing adaptive equalizer devices.

As a further example, all or a portion of exemplary apparatus 100 may represent portions of exemplary apparatus 500 in FIG. 5. In this example, controller circuit 104 in FIG. 1 may include and/or represent a CPU 516 in FIG. 5. Memory device 106 in FIG. 1 may include and/or represent an EEPROM device 506 in FIG. 5 communicatively coupled to CPU 516 via an $I^2C$ or SPI communication bus. Accordingly, EEPROM device 506 may include and/or store firmware 108.

In one example, CPU 516 may retrieve firmware 108 from EEPROM device 506 via the $I^2C$ or SPI communication bus. Upon retrieving firmware 108 from EEPROM device 506, CPU 516 may serially write at least a portion of firmware 108 to each of adaptive equalizer devices 102(1)-(N) via the $I^2C$ or SPI communication bus. For example, CPU 516 may write portion 202(1) of firmware 108 to adaptive equalizer device 102(1) via the $I^2C$ or SPI communication bus. CPU 516 may then write portion 202(N) of firmware 108 to adaptive equalizer device 102(N) via the $I^2C$ or SPI communication bus. By serially writing portions 202(1)-(N) of firmware 108 to adaptive equalizer devices 102(1)-(N) in this way, CPU 516 may configure adaptive equalizer devices 102(1)-(N) for operation in accordance with firmware 108. CPU 516 may be unable to perform these writes simultaneously like FPGA 304 due at least in part to a lack of parallel processing capabilities.

In one example, CPU 516 may include a temporary data buffer (not illustrated in FIG. 5) that temporarily stores at least a portion of firmware 108. In this example, the temporary data buffer may include and/or represent at least a portion of RAM internal and/or accessible to CPU 416.

As explained in connection with FIGS. 1-5, a single memory device may store firmware intended for a plurality of adaptive equalizer devices. By enabling a single memory device to store the firmware intended for a plurality of adaptive equalizer devices, any of exemplary apparatuses 100, 300, 400, and 500 may help reduce the amount of physical space needed to support distribution of the firmware to all of the adaptive equalizer devices at power-on. Moreover, by reducing the number of memory devices needed to store the firmware intended for the plurality of adaptive equalizer devices, any of exemplary apparatuses 100, 300, 400, and 500 may help decrease the overall cost of a PCB (such as a line card or backplane) that facilitates storage and/or distribution of such firmware. Additionally or alternatively, these apparatuses may help decrease the amount of software support, diagnostics, and/or testing needed to ensure that the PCBs are fully operational.

Figure 6:
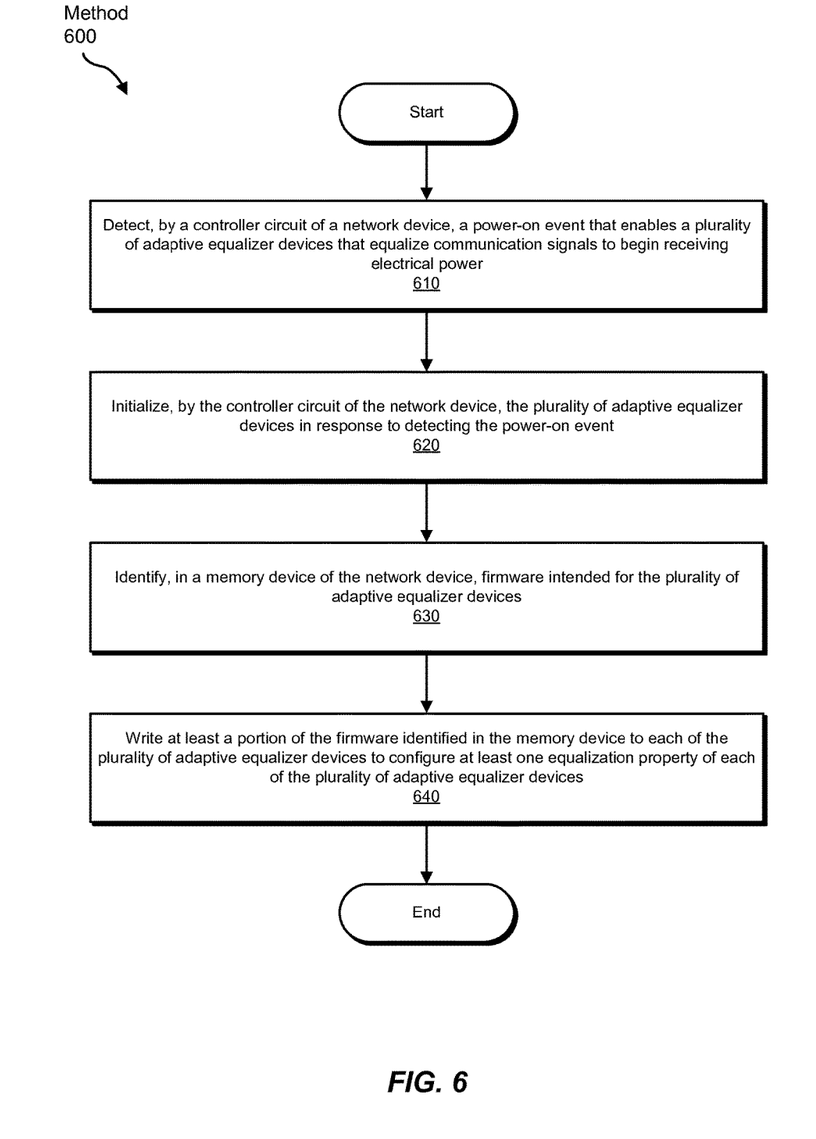
FIG. 6 is a flow diagram of an exemplary method for initializing adaptive equalizer devices.

FIG. 6 is a flow diagram of an exemplary method 600 for initializing adaptive equalizer devices. Method 600 may include the step of detecting a power-on event that enables a plurality of adaptive equalizer devices to begin receiving electrical power (610). This detecting step may be performed in a variety of ways. For example, controller circuit 104 may, as part of a network device, determine that adaptive equalizer devices 102(1)-(N) have begun to receive electrical power based at least in part on a power-up and/or boot-up process or notification. Additionally or alternatively, controller circuit 104 may detect a switch or change from power-off to power-on in connection with adaptive equalizer devices 102(1)-(N).

Returning to FIG. 6, method 600 may also include the step of initializing the plurality of adaptive equalizer devices in response to detecting the power-on event (620). This initializing step may be performed in a variety of ways. For example, controller circuit 104 may, as part of the network device, configure adaptive equalizer devices 102(1)-(N) for operation in response to determining that adaptive equalizer devices 102(1)-(N) have begun to receive electrical power. Additionally or alternatively, controller circuit 104 may configure adaptive equalizer devices 102(1)-(N) for operation in response to detecting a switch or change from power-off to power-on in connection with adaptive equalizer devices 102(1)-(N).

The initializing step may also involve identifying firmware intended for the plurality of adaptive equalizer devices and/or writing at least a portion of the firmware to each of the plurality of adaptive equalizer devices. For example, returning to FIG. 6, method 600 may further include the step of identifying firmware intended for the plurality of adaptive equalizer devices in a memory device (630). This identifying step may be performed in a variety of ways. In one example, controller circuit 104 may, as part of the network device, identify firmware 108 stored in BRAM 306 and/or BRAM 406. Additionally or alternatively, controller circuit 104 may identify firmware 108 stored in EEPROM device 506.

Returning to FIG. 6, method 600 may additionally include the step of writing at least a portion of the firmware identified in the memory device to each of the plurality of adaptive equalizer devices to configure at least one equalization property of each of the plurality of adaptive equalizer devices (640). The term "equalization property," as used herein, generally refers to any type or form of property of an adaptive equalizer device that affects and/or influences the equalization and/or conditioning of a communication signal. This writing step may be performed in a variety of ways. For example, controller circuit 104 may, as part of the network device, simultaneously write at least a portion of firmware 108 to each of adaptive equalizer devices 102(1)-(N) via an I$^2$C or SPI communication bus. Additionally or alternatively, controller circuit 104 may serially write at least a portion of firmware 108 to each of adaptive equalizer devices 102(1)-(N) via the I$^2$C or SPI communication bus.

Figure 7:
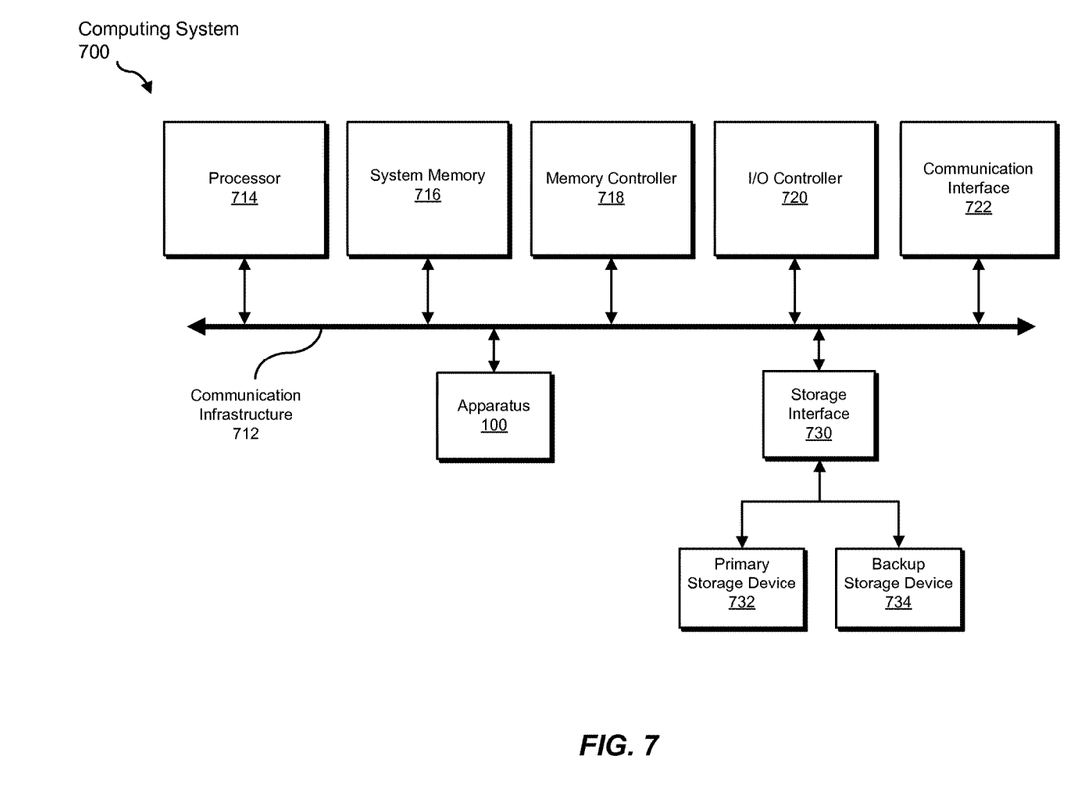
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 6. All or a portion of computing system 700 may also perform and/or be a means for performing and/or implementing any other steps, methods, or processes described and/or illustrated herein. In one example, computing system 700 may include apparatus 100 from FIG. 1.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an application-specific integrated circuit (ASIC), a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, RAM, ROM, flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an I/O controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a PCI, a PCIe, and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
 a Block Random-Access Memory (BRAM) device that stores firmware intended for a plurality of programmable adaptive equalizer devices that equalize communication signals received via a plurality of communication channels by adapting to one or more time-varying properties of the plurality of communication channels; and
 a Field-Programmable Gate Array (FPGA) that includes the BRAM device, wherein the FPGA:
  downloads, to the BRAM device during a configuration process, a configuration image that:
   defines a programmable logic configuration for the FPGA; and
   includes the firmware intended for the plurality of programmable adaptive equalizer devices, wherein the firmware intended for the plurality of programmable adaptive equalizer devices represents a portion of data included in the configuration image downloaded to the BRAM device during the configuration process;
  retrieves the firmware from the configuration image downloaded to the BRAM device to facilitate simultaneously writing at least a portion of the firmware to each of the plurality of programmable adaptive equalizer devices;
  detects a power-on event during which the plurality of programmable adaptive equalizer devices begin to receive electrical power; and
  initializes, in response to detecting the power-on event, the plurality of programmable adaptive equalizer devices by simultaneously writing, via parallel processing and an Inter-Integrated Circuit ($I^2C$) communication bus, the portion of firmware stored in the BRAM device to the plurality of programmable adaptive equalizer devices such that the plurality of programmable adaptive equalizer devices equalize the communication signals in accordance with the firmware.

2. The apparatus of claim 1, wherein:
 the FPGA operates as a master; and
 the plurality of programmable adaptive equalizer devices operate as slaves communicatively coupled to the master via an Inter-Integrated Circuit ($I^2C$) communication bus.

3. The apparatus of claim 1, further comprising a Central Processing Unit (CPU) communicatively coupled to the FPGA via a Peripheral Component Interconnect (PCI) communication bus.

4. The apparatus of claim 3, wherein the CPU:
 obtains the firmware from the BRAM device via the PCI communication bus.

5. The apparatus of claim 1, further comprising a Printed Circuit Board (PCB) that includes a plurality of conductive traces that facilitate interfacing the FPGA with the plurality of programmable adaptive equalizer devices.

6. A system comprising:
 a PCB that includes a plurality of conductive traces;
 a plurality of communication channels that facilitate reception of communication signals via the PCB;
 a BRAM device that stores firmware intended for a plurality of programmable adaptive equalizer devices that equalize communication signals received via the plurality of communication channels by adapting to one or more time-varying properties of the plurality of communication channels; and
 an FPGA that includes the BRAM device and is coupled to the PCB, wherein the FPGA:
  downloads, to the BRAM device during a configuration process, a configuration image that:
   defines a programmable logic configuration for the FPGA; and
   includes the firmware intended for the plurality of programmable adaptive equalizer devices, wherein the firmware intended for the plurality of programmable adaptive equalizer devices represents a portion of data included in the configuration image downloaded to the BRAM device during the configuration process;
  retrieves the firmware from the configuration image downloaded to the BRAM device to facilitate simultaneously writing at least a portion of the firmware to each of the plurality of programmable adaptive equalizer devices;
  detects a power-on event during which the plurality of programmable adaptive equalizer devices begin to receive electrical power via the PCB; and
  initializes, in response to detecting the power-on event, the plurality of programmable adaptive equalizer devices by simultaneously writing, via parallel processing and an $I^2C$ communication bus, the portion of firmware stored in the BRAM device to the plurality of programmable adaptive equalizer devices via the PCB such that the plurality of programmable adaptive equalizer devices equalize the communication signals in accordance with the firmware.

7. The system of claim 6, wherein:
 the FPGA operates as a master; and
 the plurality of programmable adaptive equalizer devices operate as slaves communicatively coupled to the master via an $I^2C$ communication bus.

8. The system of claim 6, further comprising a CPU communicatively coupled to the FPGA via a PCI communication bus, wherein the CPU:
 obtains the firmware from the BRAM device via the PCI communication bus.

9. A method comprising:
 downloading, to a BRAM device included in an FPGA of a network device during a configuration process, a configuration image that:
  defines a programmable logic configuration for the FPGA; and
  includes firmware intended for a plurality of programmable adaptive equalizer devices, wherein the firmware intended for the plurality of programmable adaptive equalizer devices represents a portion of data included in the configuration image downloaded to the BRAM device during the configuration process;
 retrieving the firmware from the configuration image downloaded to the BRAM device to facilitate simultaneously writing at least a portion of the firmware to each of the plurality of programmable adaptive equalizer devices;
 detecting, by the FPGA of the network device, a power-on event that enables a plurality of programmable adaptive equalizer devices that equalize communication signals received via a plurality of communication channels to begin receiving electrical power, the plurality of programmable adaptive equalizer devices equalizing the communication signals by adapting to one or more time-varying properties of the plurality of communication channels; and initializing, by the FPGA of the network device, the plurality of programmable adaptive equalizer devices in response to detecting the power-on event by:
identifying, in the BRAM device of the network device, firmware intended for the plurality of programmable adaptive equalizer devices; and
simultaneously writing, via parallel processing and an I²C communication bus, the portion of firmware identified in the BRAM device to each of the plurality of programmable adaptive equalizer devices to configure at least one equalization property of each of the plurality of programmable adaptive equalizer devices such that the plurality of programmable adaptive equalizer devices equalize the communication signals in accordance with the firmware.

* * * * *